(12) United States Patent
Wang (10) Patent No.: US 8,302,866 B2
(45) Date of Patent: Nov. 6, 2012

(54) OPTICAL READER USING DISTANCE MAP DECODING

(75) Inventor: Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 201 days.

(21) Appl. No.: 12/870,269

(22) Filed: Aug. 27, 2010

(65) Prior Publication Data

US 2012/0048941 A1 Mar. 1, 2012

(51) Int. Cl.
*G02B 26/08* (2006.01)
*G06K 7/10* (2006.01)

(52) U.S. Cl. .................. 235/462.22; 235/454; 235/375

(58) Field of Classification Search .......... 235/462.22, 235/375, 454, 462.01, 462.32
See application file for complete search history.

(56) References Cited

U.S. PATENT DOCUMENTS

| | | | |
|---|---|---|---|
| 5,396,054 A | 3/1995 | Krichever et al. | |
| 5,557,092 A * | 9/1996 | Ackley et al. | 235/462.07 |
| 5,811,776 A | 9/1998 | Liu | |
| 5,825,006 A | 10/1998 | Longacre, Jr. et al. | |
| 5,854,478 A | 12/1998 | Liu et al. | |
| 5,969,326 A | 10/1999 | Ogami | |
| 5,984,174 A * | 11/1999 | Kato et al. | 235/375 |
| 6,095,422 A | 8/2000 | Ogami | |
| 6,446,868 B1 * | 9/2002 | Robertson et al. | 235/462.1 |
| 7,093,763 B1 | 8/2006 | Madej | |
| 7,124,948 B2 | 10/2006 | Longacre, Jr. et al. | |
| 7,147,159 B2 | 12/2006 | Longacre, Jr. et al. | |
| 7,275,694 B2 | 10/2007 | Longacre, Jr. | |
| 7,398,929 B2 | 7/2008 | Longacre, Jr. et al. | |
| 2007/0272755 A1 * | 11/2007 | Chang et al. | 235/462.11 |

OTHER PUBLICATIONS

Theo Pavlidis, Jerome Swartz, and Ynjiun P. Wang, Fundamentals of Bar Code Information Theory, Symbol Technologies, 1990, IEEE, 13 pages.

* cited by examiner

*Primary Examiner* — Edwyn Labaze
(74) *Attorney, Agent, or Firm* — Heslin Rothenberg Farley & Mesiti P.C.

(57) ABSTRACT

A method for decoding an encoded candidate character of a symbology is provided that includes the steps of providing a plurality of valid barcode characters of a symbology having n elements, generating a seed codeword comprising n elements, computing a seed distance value from the seed codeword to each character in the symbology, generating a distance map comprising each character in the symbology and the associated computed seed distance value, and arranging the plurality of seed distance values into a plurality of bins. Each bin contains a subset of the characters in the symbology. The method includes the steps of selecting a candidate barcode character for decoding, computing a candidate distance value from the candidate barcode character to the seed codeword, identifying the bin containing the candidate distance value, and comparing the candidate barcode character with the valid barcode characters in the bin having the candidate distance value.

25 Claims, 7 Drawing Sheets

| Value | Code 128B Character | Bar/Space Weights | Seed Codeword | Seed Distance Value |
|---|---|---|---|---|
| 0 | space | 212222 | 111221 | 3 |
| 1 | ! | 222122 | 111221 | 5 |
| 2 | " | 222221 | 111221 | 3 |
| 3 | # | 121223 | 111221 | 3 |
| 4 | $ | 121322 | 111221 | 3 |
| 5 | % | 131222 | 111221 | 3 |
| 6 | & | 122213 | 111221 | 5 |
| 7 | ' | 122312 | 111221 | 5 |
| 8 | ( | 132212 | 111221 | 5 |
| 9 | ) | 221213 | 111221 | 5 |
| 10 | * | 221312 | 111221 | 5 |
| 11 | + | 231212 | 111221 | 5 |
| 12 | , | 112232 | 111221 | 3 |
| 13 | - | 122132 | 111221 | 5 |
| 14 | . | 122231 | 111221 | 3 |
| 15 | / | 113222 | 111221 | 3 |
| 16 | 0 | 123122 | 111221 | 5 |
| 17 | 1 | 123221 | 111221 | 3 |
| 18 | 2 | 223211 | 111221 | 5 |
| 19 | 3 | 221132 | 111221 | 5 |
| 20 | 4 | 221231 | 111221 | 3 |
| 21 | 5 | 213212 | 111221 | 5 |
| 22 | 6 | 223112 | 111221 | 7 |
| 23 | 7 | 312131 | 111221 | 5 |
| 24 | 8 | 311222 | 111221 | 3 |
| 25 | 9 | 321122 | 111221 | 5 |
| 26 | : | 321221 | 111221 | 3 |
| 27 | ; | 312212 | 111221 | 5 |
| 28 | < | 322112 | 111221 | 7 |
| 29 | = | 322211 | 111221 | 5 |
| 30 | > | 212123 | 111221 | 5 |
| 31 | ? | 212321 | 111221 | 3 |
| 32 | @ | 232121 | 111221 | 5 |
| 33 | A | 111323 | 111221 | 5 |
| 34 | B | 131123 | 111221 | 5 |
| 35 | C | 131321 | 111221 | 3 |
| 36 | D | 112313 | 111221 | 5 |
| 37 | E | 132113 | 111221 | 7 |
| 38 | F | 132311 | 111221 | 5 |
| 39 | G | 211313 | 111221 | 5 |
| 40 | H | 231113 | 111221 | 7 |
| 41 | I | 231311 | 111221 | 5 |
| 42 | J | 112133 | 111221 | 5 |
| 43 | K | 112331 | 111221 | 3 |
| 44 | L | 132131 | 111221 | 5 |

FIG. 4

| Value | Code 128B Character | Bar/Space Weights | Distance |
|---|---|---|---|
| 0 | space | 212222 | 3 |
| 2 | " | 222221 | 3 |
| 3 | # | 121223 | 3 |
| 4 | $ | 121322 | 3 |
| 5 | % | 131222 | 3 |
| 12 | , | 112232 | 3 |
| 14 | . | 122231 | 3 |
| 15 | / | 113222 | 3 |
| 17 | 1 | 123221 | 3 |
| 20 | 4 | 221231 | 3 |
| 24 | 8 | 311222 | 3 |
| 26 | : | 321221 | 3 |
| 31 | ? | 212321 | 3 |
| 31 | A | 111323 | 3 |
| 35 | C | 131321 | 3 |

| Value | Code 128B Character | Bar/Space Weights | Distance |
|---|---|---|---|
| 1 | ! | 222122 | 5 |
| 6 | & | 122213 | 5 |
| 7 | ' | 122312 | 5 |
| 8 | ( | 132212 | 5 |
| 9 | ) | 221213 | 5 |
| 10 | * | 221312 | 5 |
| 11 | + | 231212 | 5 |
| 13 | - | 122132 | 5 |
| 16 | 0 | 123122 | 5 |
| 18 | 2 | 223211 | 5 |
| 19 | 3 | 221132 | 5 |
| 21 | 5 | 213212 | 5 |
| 23 | 7 | 312131 | 5 |
| 25 | 9 | 321122 | 5 |
| 27 | ; | 312212 | 5 |
| 29 | = | 322211 | 5 |
| 30 | > | 212123 | 5 |
| 32 | @ | 232121 | 5 |
| 34 | B | 131123 | 5 |
| 36 | D | 112313 | 5 |
| 38 | F | 132311 | 5 |
| 39 | G | 211313 | 5 |
| 41 | I | 231311 | 5 |
| 42 | J | 112133 | 5 |

| Value | Code 128B Character | Bar/Space Weights | Distance |
|---|---|---|---|
| 22 | 6 | 223112 | 7 |
| 28 | < | 322112 | 7 |
| 37 | E | 132113 | 7 |
| 40 | H | 231113 | 7 |

BIN 3 COUNT = 15

BIN 5 COUNT = 24

BIN 7 COUNT = 4

| Value | Code 128B Character | Bar/Space Weights | Primary Bin | Second Seed Codeword | Hamming Distance |
|---|---|---|---|---|---|
| 16 | 0 | 123122 | 5 | 123123 | 1 |
| | | | | | |
| 1 | ! | 222122 | 5 | 123123 | 3 |
| 6 | & | 122213 | 5 | 123123 | 3 |
| 13 | - | 122132 | 5 | 123123 | 3 |
| 30 | > | 212123 | 5 | 123123 | 3 |
| 34 | B | 131123 | 5 | 123123 | 3 |
| 42 | J | 112133 | 5 | 123123 | 3 |
| | | | | | |
| 7 | ' | 122312 | 5 | 123123 | 5 |
| 8 | ( | 132212 | 5 | 123123 | 5 |
| 9 | ) | 221213 | 5 | 123123 | 5 |
| 18 | 2 | 223211 | 5 | 123123 | 5 |
| 19 | 3 | 221132 | 5 | 123123 | 5 |
| 21 | 5 | 213212 | 5 | 123123 | 5 |
| 25 | 9 | 321122 | 5 | 123123 | 5 |
| 32 | @ | 232121 | 5 | 123123 | 5 |
| 36 | D | 112313 | 5 | 123123 | 5 |
| | | | | | |
| 10 | * | 221312 | 5 | 123123 | 7 |
| 11 | + | 231212 | 5 | 123123 | 7 |
| 23 | 7 | 312131 | 5 | 123123 | 7 |
| 27 | ; | 312212 | 5 | 123123 | 7 |
| 29 | = | 322211 | 5 | 123123 | 7 |
| 38 | F | 132311 | 5 | 123123 | 7 |
| 39 | G | 211313 | 5 | 123123 | 7 |
| | | | | | |
| 41 | I | 231311 | 5 | 123123 | 9 |

BIN 1 COUNT = 1

BIN 3 COUNT = 6

BIN 5 COUNT = 9

BIN 7 COUNT = 1

BIN 9 COUNT = 1

OPTICAL READER USING DISTANCE MAP DECODING

FIELD OF THE INVENTION

This invention relates generally to the field of optical scanning systems, and more particularly to a system and method for decoding images that increases performance of the system.

BACKGROUND OF THE INVENTION

Various optical scanning apparatus have been developed to read and decode optical indicia, such bar as code symbols on a target such as a label. While early barcode scanners were designed to read symbols at a relatively close distance, there exists a need to read symbols at greater and greater distances, for example in warehousing environments. Conventional optical scanning systems, such as hand-held barcode laser scanners, typically have a limited working range due to the constraints imposed on the optical assembly. Motorized systems with additional lenses or mirrors have been developed to re-position the laser beam waist relative to the fixed lens assembly, thereby increasing the working range of the scanning apparatus, but such improvements are complicated and add cost.

Decoding images has always proved challenging, in part because decoding systems work best with a sharp representation of the barcode symbol, and a sharp representation is not always possible. Due to optical, environmental or physical factors, the representation may be out of focus, too close to the reader, or too far away from the reader. One solution to this problem is to manually move the symbol to a range within the capability of the reader, either by moving the scanning apparatus or by moving the target. This solution can be cumbersome, frustrating, or may not even be possible.

Other solutions utilize the barcode scanner internal circuitry to analyze incoming signals and attempt to identify and segregate actual barcode characters from noise, or to identify barcode characters when the incoming signal is weak or distorted. Analog circuits using this approach are bulky and consume power, which has a deleterious effect on battery life. Digital circuits using this approach rely on advances in microprocessing speed, but are still slow due to the enormous number of iterations required to properly identify and verify a valid codeword.

SUMMARY OF THE INVENTION

In one aspect, the invention relates to an optical reader for decoding an encoded candidate character of a symbology. The optical reader includes a lens system for focusing an illuminated encoded candidate character at a plane of focus, and an optical sensor. The optical sensor includes as an input the detected light intensity corresponding to the illumination reflected from the encoded candidate character, and further includes as an output an electrical signal encoding information representative of the encoded candidate character. The optical reader accesses a distance map comprising a seed codeword and a plurality of seed distance values. Each seed distance value comprises a computed distance from the seed codeword to a character of the symbology. The optical reader computes a candidate distance value from the seed codeword to the encoded candidate character, and compares the encoded candidate character to a subset of the characters of the symbology, the subset comprising characters of the symbology having seed distance values within a specified range of the candidate distance value.

In another aspect, a method for decoding an encoded candidate character of a symbology is provided that includes the step of providing a plurality of valid barcode characters of a symbology, each barcode character having n elements in conformance with the symbology. The method further includes the steps of generating a seed codeword comprising n elements, and computing a seed distance value from the seed codeword to each character in the symbology. The method further includes the steps of generating a distance map comprising each character in the symbology and the associated computed seed distance value, and arranging the plurality of seed distance values into a plurality of bins. Each bin contains a subset of the characters in the symbology. A candidate barcode character comprising n elements is selected for decoding. The method further includes the steps of computing a candidate distance value from the candidate barcode character to the seed codeword, identifying the bin containing the candidate distance value, and attempting to decode the candidate barcode character by comparing the candidate barcode character with the valid barcode characters in the bin having the candidate distance value.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In a barcode image, some a priori knowledge is available of what the particular barcode is expected to look like, and hence how it is expected to appear in coded form. For example, a barcode image may comprise one or more bars and spaces (i.e., is represented by a step function, or in some embodiments, is a function representable as a gray scale). When imaged with an imaging engine or a barcode reader, the barcode is represented as a codeword, or character, having a sequence of binary, or in some cases, gray scale, values. In principle, a decode table which defines the exact step function (or gray scale value) of each valid character is available. However, checking each barcode image against every entry in a decode table is time-consuming, even for modern processors. The systems and methods of the present invention provide a means by which the barcode image may be accurately decoded by checking only a small subset of the decode table, thereby decreasing the decode time.

As used herein, "symbol" is intended to denote a combination of barcode characters (including start/stop characters, quiet zones, data characters, and check characters required by a particular symbology), that forms a complete scannable entity. A barcode "character" is intended to denote a single group of bars and spaces that represent a number, letter, punctuation mark, or the like. A barcode "element" is intended to denote a single bar or space in a barcode character. A "decode table" is intended to denote those characters available for encodation and decodation in a particular symbology.

Figure 1:
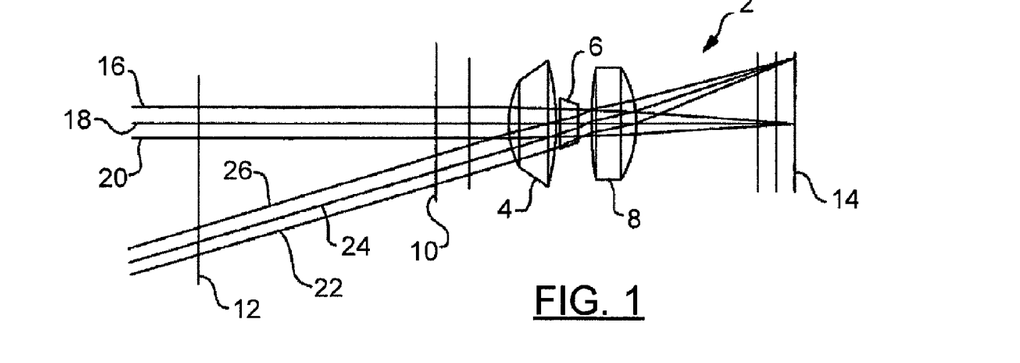
FIG. 1 is a schematic diagram showing in cross section an illustrative embodiment of an optical reader according to the principles of the invention.

Referring to FIG. 1, an illustrative optical reader 2 is shown in schematic cross section. In one embodiment, an imager according to the invention is employed in a handheld reader or a portable reader having a trigger mechanism that can be actuated by a user. Upon activation of the trigger by a user, the portable, handheld reader captures an image and processes the image using the systems and methods described herein. The hand held optical reader 2 can be any device capable of reading optical indicia, such as bar code symbols, including linear, two dimensional, and matrix, and may be in the form of an optical scanner or imager. Examples of optical indicia include PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, KIX (Netherlands) Post, OCR-A, and OCR-B.

The optical reader 2 has an optical sensor for receiving light corresponding to an image of interest, and for providing an electrical signal encoding information representative of at least a portion of the image of interest. In some embodiments, the optical sensor is a 1-D sensor, a 2-D sensor, a sensor operating as an optical array of individual pixel sensors, such as CMOS or CCD sensors. The optical reader 2 has an optical lens system in optical communication with the optical sensor. The optical reader 2 comprises one or more lenses 4, 6, 8, and causes an image of an object positioned at a plane 10 or 12 to be imaged to a focus at a plane 14. The rays 16, 18 and 20 on the axis of the imager and the rays 22, 24, and 26 off the imager axis are rays useful to show the field of view of the imager.

The optical reader 2 has a memory (or a machine-readable storage medium), and control circuitry. The memory can contain a representation of an electrical signal encoding information representative of the image of interest, for example in a lookup or decode table. The memory can also contain a second lookup table, termed a distance map, that alleviates the decoding processor from having to scan through the entire list of characters in the decode table. The optical reader successfully decodes the information encoded in the electrical signal by comparing the corresponding representation of an electrical signal contained in the memory (e.g., decode table or distance map) with the electrical signal provided from the optical sensor.

Figure 2:
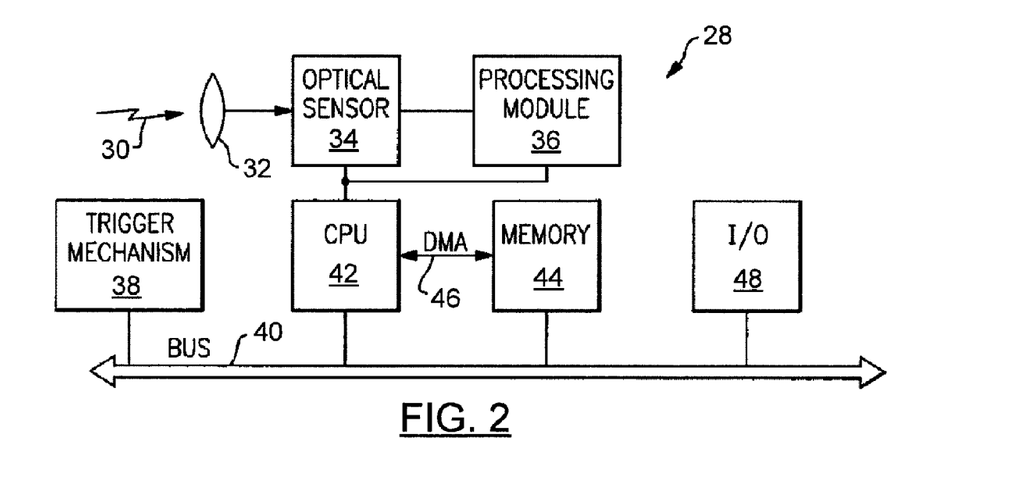
FIG. 2 is a schematic block diagram showing the electronic components of an illustrative embodiment of an optical reader and their interrelationships, according to principles of the invention.

FIG. 2 is a schematic block diagram 28 showing the electronic components of an illustrative optical reader 2 and their interrelationships. In FIG. 2, incoming illumination 30 from a target of interest is indicated by the arrow, and a lens system 32, corresponding to one or more of lenses 4, 6, and 8 for FIG. 1, receives the incoming illumination 30. The lens system 32 causes at least some of the illumination 30 to be focused at or near a plane of focus where there is situated an optical sensor 34. The optical sensor 34 converts the illumination into electrical signals. A processing module 36 is provided as necessary to condition the electrical signals, perform analog-to-digital conversion, provide timing for functions such as acquiring image information at the sensor, and extracting such information as electrical signals, and other control features that may be needed for the proper operation of the optical sensor 34. As will be understood, depending on the fabrication technology used to manufacture the optical sensor 34, some or all of the functions and capabilities of the processing module may be integrated in a single semiconductor substrate with the optical sensor 34 itself. CMOS technology is one fabrication technology that offers the possibility of such integration. The construction and operation of optical readers is well known in the optical reader arts and is not described in detail herein. Optical readers using one-dimensional pixel arrays, two-dimensional pixel arrays, and laser scanning mechanisms are all known.

Optical reader 2 has a trigger mechanism 38 in electrical communication with the electronic components of the reader 2. For example, trigger mechanism 38 is shown in electrical communication with a bus 40 in FIG. 2, whereby, upon activation of trigger mechanism, signals from trigger mechanism can be communicated to the components of reader 2 that are connected to bus 40. In some alternative embodiments, the trigger mechanism 38 can be connected directly to a particular electronic component of optical reader 2, for example to computer processing unit 42 (CPU), for example by way of a hard-wired interrupt. In some embodiments, the trigger mechanism 38 is configured to be activated by any of several methods, including: the activation of the trigger mechanism by a user, for example by manual depression of a button; the sensing by way of a detector of the presence of an object of interest within a field of view of the reader; and a receipt of a command from a spaced apart device, for example from a controller situated outside the handheld, or portable, reader.

In some embodiments, the optical reader 2 has a computation module (e.g., CPU 42) in communication with a memory 44 and the optical sensor 34. The computation module 42 in some embodiments is in communication with the processing module 36. In some embodiments, some of the capabilities of the computation module 42 and of the processing module 36 are integrated in a single semiconductor chip. The computation module 42 is configured to perform the comparison of the representation of an electrical signal contained in the memory 44 with the electrical signal provided from the optical sensor 34.

The computation module 42 and the memory 44 can be in communication by way of a direct memory access channel (DMA) 46. In addition, or alternatively, the computation module 42 and the memory 44 can be connected by way of the bus 40, such as is found in conventional computer systems. Additional circuitry that provides functionality such as input/output (I/O) 48 can be connected to the bus 40 to provide the ability to send information (including commands and data) to the optical reader 2 from external sources, and to allow the optical reader 2 to communicate information to a user and/or to an external device or system, such as dealing with goods or services processed in a retail sales system, or for tracking the location and status of packages in a delivery system.

Figure 3:
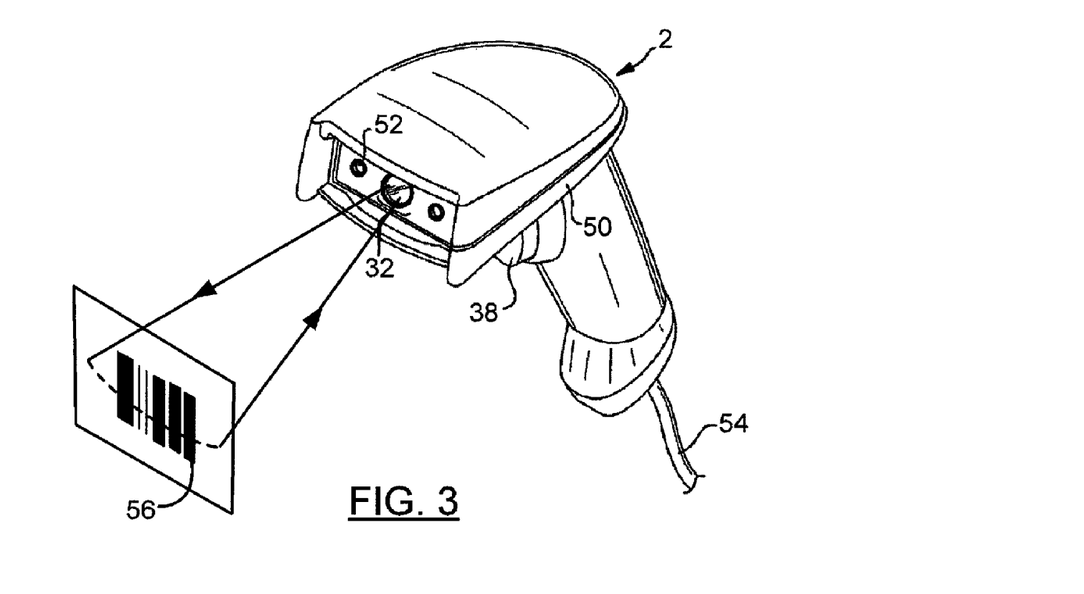
FIG. 3 is a perspective drawing of one embodiment of a hand-held optical reader constructed according to principles of the invention.

FIG. 3 is a perspective drawing of one embodiment of a hand-held image reader 2 constructed in accordance with the principles of the invention. The hand-held image reader 2 includes a housing 50, a plurality of light sources 52, a lens system 32, a trigger mechanism 38 which in the illustration is a manually activated trigger button, and an interface cable 54, which cable permits the reader 2 to communicate with other components, such as a central data processing and data storage system. In some embodiments, the hand held image reader 2 is portable, and a communication interface that does not require a wired connection (for example, a wireless communication system employing radio waves operating according to the IEEE 802.11 communication protocol, Bluetooth, infrared signals, or other wireless communication media) is used in place of interface cable 54. In various embodiments, the functionality of the image reader 2 can be provided by any one-dimensional or two-dimensional image readers constructed in accordance with the invention. All of the components described in connection with FIGS. 1-3, including one or more lenses 4, 6, and 8, trigger mechanism 38, optical sensor 34, processing module 36, CPU 42, DMA 46, memory 44, I/O 48 and bus 40, can be incorporated into, and can be supported by hand held housing 50. Lens system 32 can comprise glass and/or polycarbonate. Lens system 32 can be a lens singlet or else comprise a plurality of lens components; that is, lens system 32 can be a lens doublet or lens triplet; for example, one or more lenses 4, 6, and 8 as shown in FIG. 1.

A conventional barcode decoder tries to recover (or restore) the bar and space sequence of a barcode from a barcode image, or symbol 56. A classifier may be used to decode the bar/space sequence 56. In many embodiments, the classifier is a Euclidian Distance classifier using the bar/space sequence as the coordinate in the codeword space. In other embodiments, the classifier employ the use of a Hamming Distance or a Diagonal Distance. One noted problem with distance classifiers is that, upon receiving the image of the barcode, a distance must be computed from the image to each separate character in the symbology. Generally, the minimum distance indicates the correct character or codeword. For symbologies with a large number of characters, this computation can be taxing on the processor and slow down the decode process. The present invention improves decode time by operating on a subset of characters within the symbology rather than the entire set of characters.

The invention can be described and explained with respect to any of a number of well known bar code symbologies. In one embodiment, the Code 128 symbology will be used as an example. Code 128 is a well known and widely used one-dimensional bar code symbology. In the symbology represented by the Code 128, characters are represented by three bars and three spaces comprising a total of 11 elements. Each bar or space can be one, two, three, or four elements wide. The total number of elements representing bars in a character is an even number, and the number of elements representing spaces in a character is odd. The Code 128 symbology contains 107 unique characters including 4 function characters, 4 code set selection characters (e.g., code set A, code set B, or code set C), and 3 start characters. Thus, a decoder utilizing a distance classifier to decode a Code 128 symbology would compute 107 separate distances from the captured image to each valid codeword in the symbology, and select the character with the minimum distance as the correct codeword.

Figure 4:
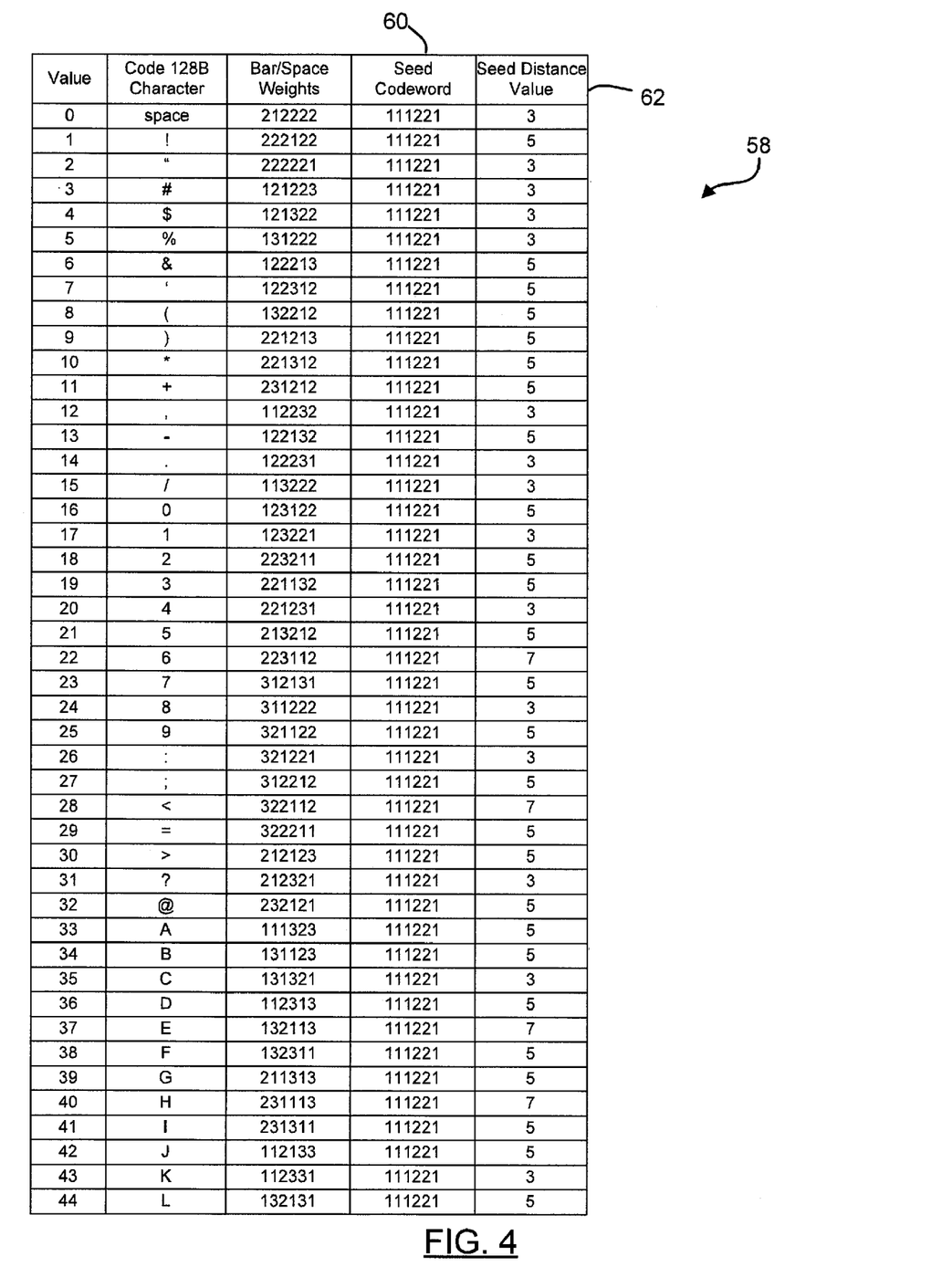
FIG. 4 is a table showing a distance map constructed according to principles of the invention.

FIG. 4 shows an exemplary distance map 58 listing a portion of a Code 128B character list, illustrating the first 44 (out of 107) characters. The column labeled "Bar/Space Weights" details the elemental widths associated with each bar and space for each valid character. The width of each bar or space can be 1, 2, 3 or 4 units. For example, the character "A" would be depicted as 10100011000, or as 111323 in the table.

In accordance with one embodiment of the invention, the distance map 58 may be constructed comprising each valid character in the symbology, a seed codeword 60, and a seed distance value 62 representing the distance between the seed codeword and the valid character of the symbology. For example, referring to FIG. 4, a seed codeword 60 is selected comprising 111221. The seed codeword 60 may be arbitrarily selected, but must comprise the same number of elements (e.g., bars/spaces) as the valid characters in the symbology. In some embodiments, the seed codeword 60 may be selected specifically to reduce the computation time. In any event, once the seed codeword 60 is selected, the seed distance value 62 may be computed. In the disclosed example, the seed distance value 62 value is computed using Hamming Distance. However, any conventional or non-conventional distance may be computed, for example Euclidean Distance or Diagonal Distance.

Figure 5:
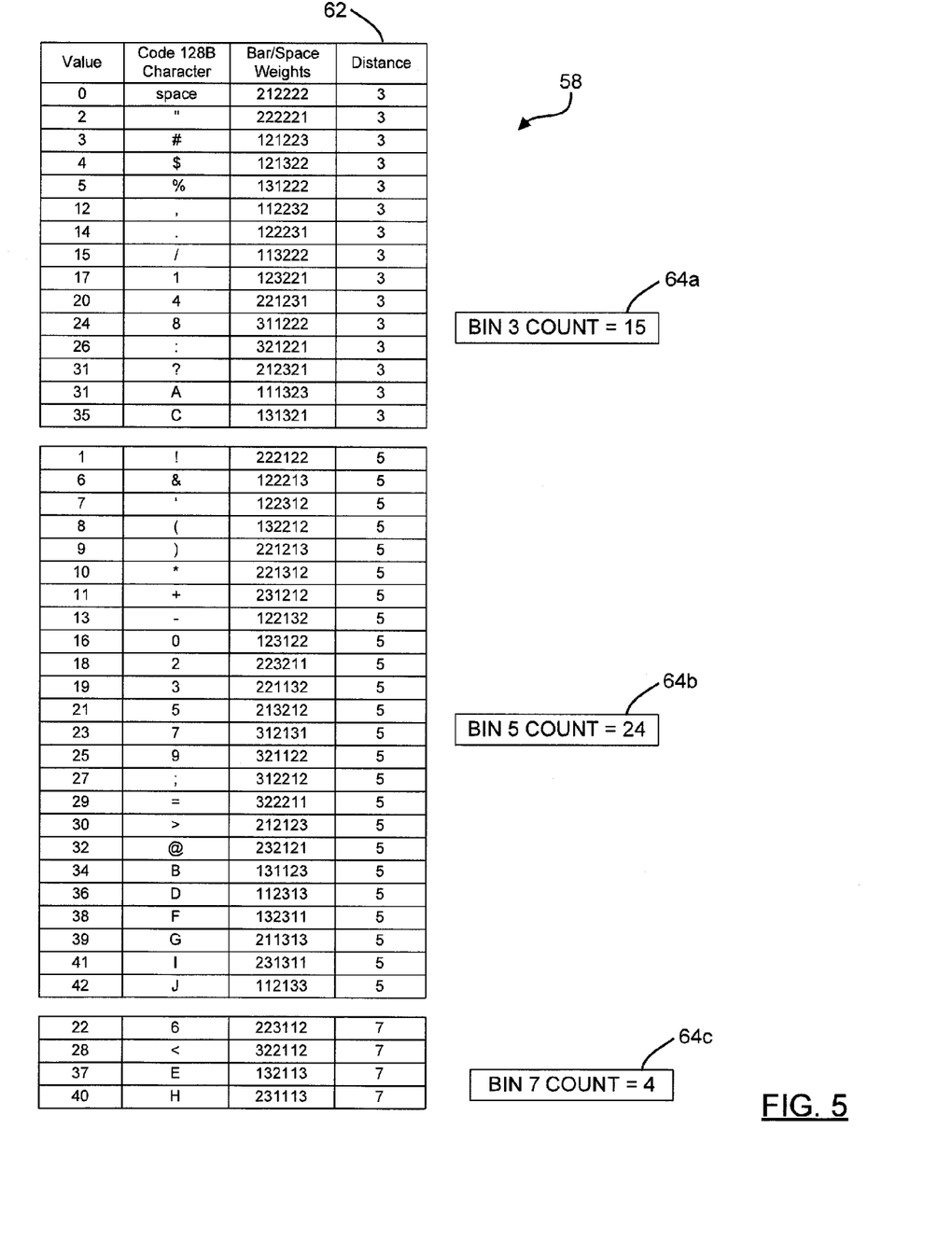
FIG. 5 is a table showing another embodiment of the distance map shown in FIG. 4.

Referring to FIG. 5, the distance map 58 may be constructed by sorting the seed distance values 62 into bins 64 comprising like distances. For example, using the seed distance values 62 obtained from the seed codeword 60 of FIG. 4, three bins may be constructed. The first bin 64*a* includes all valid characters of the symbology that are a distance 3 from the seed codeword 60. In the given example, there are 15 such characters. Continuing with the example, the second bin 64*b* includes all valid characters of the symbology that are a distance 5 from the seed codeword 60. In the given example, there are 24 such characters. The third bin 64*c* includes all valid characters of the symbology that are a distance 7 from the seed codeword 60. In the given example, there are 4 such characters. Depending upon the symbology and the seed codeword 60 selected, any number of bins may be constructed. In another example, the bins may comprise ranges of distances, such as 0.00-0.99; 1.00-1.99; 2.00-2.99, etc. Following this example, the first bin 64*a* may be assigned the range 0.00-4.00; the second bin 64*b* may be assigned the range 4.01-6.00; and the third bin 64*c* may be assigned the range 6.01-8.99. The distance map 58 may be stored in memory 44 of the optical reader 2 to be accessed during the decode process.

Figure 6:
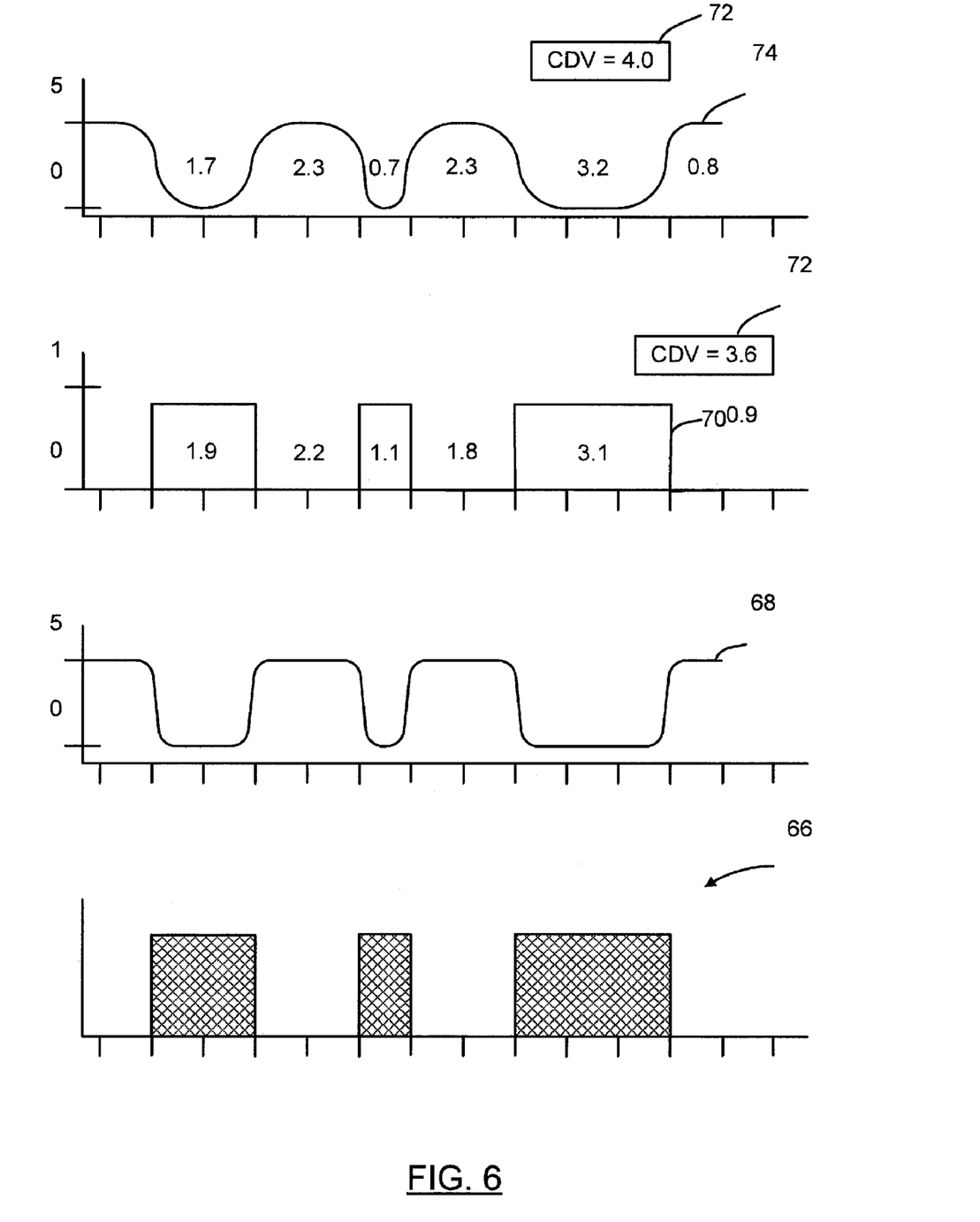
FIG. 6 is a diagram that illustrates various signals, including recorded signals detected from a bar code, and signals obtained by subjecting the recorded signals to signal processing methods, according to principles of the invention.

FIG. 6 is a diagram that illustrates various signals, including recorded signals detected from a bar code, and signals obtained by subjecting the recorded signals to signal processing methods. In FIG. 6, the intensity of reflected illumination is given along the vertical axis (in arbitrary units). For reflective regions, such as white spaces, the reflectivity is relatively high, and the curve is correspondingly indicated as having a higher numerical value on the vertical axis. For black bars, which have lower reflectivity, the curve has a correspondingly lower numerical value on the vertical axis. In FIG. 6, the horizontal axis represents distance along the scan line shown passing over a candidate bar code image 66, which may be the symbol 56 shown in FIG. 3.

In FIG. 6, a first curve 68 represents a signal recorded as the output signal of a detector that detects light intensity corresponding to illumination reflected from an encoded symbol character and that generates an electrical signal from the detected light intensity. The first curve 68 is representative of an actual signal for an encoded character that is well-focused on the lens system 32 of the optical reader 2. That is, the transitions between reflective and non-reflective regions are sharp and well-defined. The step function 70 identified in FIG. 6 is the signal derived from curve 68 by subjecting the curve 68 to the action of an edge-crossing detection module. The edge-crossing detection module can be implemented in hardware (e.g., a hardware logic circuit or an edge detection circuit), or it can be implemented in software (e.g., a programmable processor programmed with a suitable set of instructions to identify when curve 68 crosses a threshold value).

In reading the sequence of fluctuations or changes of state in the data of curve 68, or in the step function 70 derived from curve 68, there is a mathematical sequence of widths of the elements (the bars and spaces) that appear in the encoded symbol characters; this sequence is termed the "e-sequence" or "eseq" for convenience. An element width sequence ("eseq") can be derived from measuring the width of edge to edge transitions of the step function 70. For example, using available digital signal processing methods, the step function 70 e-sequence, as derived from the raw data, may comprise a character having element widths of 1.9, 2.2, 1.1, 1.8, 3.1, 0.9, as shown.

Using prior art decoding methods, the candidate bar code image 66 raw data was subjected to a quantization process in which the element widths were rounded up or down to arrive at unitary distances. The decoder then attempted to map the new character of unitary distances to a valid codeword in the symbology, which entailed comparing the character to every character in the symbology until a valid result was obtained. One problem with this method was that the rounding process could produce an invalid codeword if the raw signal was weak or distorted. Another problem was that the mapping process was time-consuming.

According to one embodiment of the invention, a candidate distance value (CDV) 72 may be computed and matched to the appropriate bin 64 in the distance map 58. The candidate distance value 72 is the distance from the candidate bar code image 66 to the seed codeword 60. For example, using the same distance computation method as that applied in computing the seed distance value 62 (e.g., Hamming Distance), the candidate distance value 72 for the candidate bar code image 66 is computed to be 3.6. Referring to the exemplary distance map 58 constructed above in reference to FIG. 5, a candidate distance value of 3.6 is matched to the first bin 64*a*, which was assigned the range of 0.00-3.99. Using any conventional decode process, the candidate bar code image 66 is then checked against the valid characters in bin 64*a*. In one example, the candidate bar code image 66 may be quantized, resulting in a character comprising bar/space widths of 2-2-1-2-3-1, correlating to the Code 128B character "4" in bin 64*a*. In another example, a minimum distance may be determined between the candidate bar code image 66 and each valid character in the bin 64, and the character with the minimum distance is selected as the correct codeword.

The decoder attempts to decode the candidate bar code image 66 by mapping the image only to the valid characters within the bin of interest, and ignoring the characters in the other bins. In this manner, decode is attempted on only a subset of the characters in the symbology, and far fewer solution possibilities need to be checked. In the given example, the decoder only needs to check the candidate bar code image 66 against a subset of 15 valid characters (versus the original 44), thereby decreasing the decode time by up to 66%. Similarly, a candidate bar code image having a candidate distance value matched to bin 64*b* would only need to be checked against a subset of 24 valid characters, thereby decreasing the decode time by as much as 45%. A candidate bar code image having a candidate distance value matched to bin 64*c* would only need to be checked against a subset of 4 valid characters, thereby decreasing the decode time by as much as 91%.

Referring to FIG. 6, a third curve 74 represents a signal for an encoded character that is poorly focused on the lens system 32 of the optical reader 2, such as may be found when reading a barcode outside of a pixel resolution limitation, hand motion smearing a bar code while capturing the image, or reading a bar code that is outside of limit of the depth of field of the image reader, for example. In such instances, the transitions between reflective and non-reflective regions are gradual and ill-defined. Using conventional techniques, the e-sequence may comprise a character having element widths of 1.7, 2.3, 0.7, 2.3, 3.2, 0.8, as shown. In one technique, the e-sequence values may be determined using a step function derived from the third curve 74 by subjecting the curve 74 to the action of an edge-crossing detection module. Although the representative signal 74 may be difficult to ascertain, the candidate distance value 72 can still be computed using the e-sequence values. In the given example, the candidate distance value (CDV) 72 is 4.0, which value would still be assigned to bin 64*a*. Thus, even though the candidate bar code image 66 may lie outside the limit of the depth of field of the image reader, a decode attempt may still be successful.

The computation of the seed distance value 62 and the candidate distance value 72 may be carried out by conventional or non-conventional methods. In the exemplary embodiment disclosed above, a Hamming Distance method was utilized, primarily due to its simplicity. The Hamming Distance may be defined as the number of positions at which the corresponding elements are different. Put another way, it measures the minimum number of substitutions required to change one element into the other, or the number of errors that transformed one element into the other. However, other distance computations may be utilized without departing from the scope of the invention. For example, Euclidean distances may be computed. Euclidean distance is the "ordinary" distance between two points that one would measure with a ruler, and is given by the Pythagorean formula. Another possible distance computation is the Diagonal Distance, as explained in Chapter 3 of the PhD thesis entitled "Spatial Information and Coding Theory," authored by Y. P. Wang (SUNY Stony Brook, December 1989).

Figure 7:
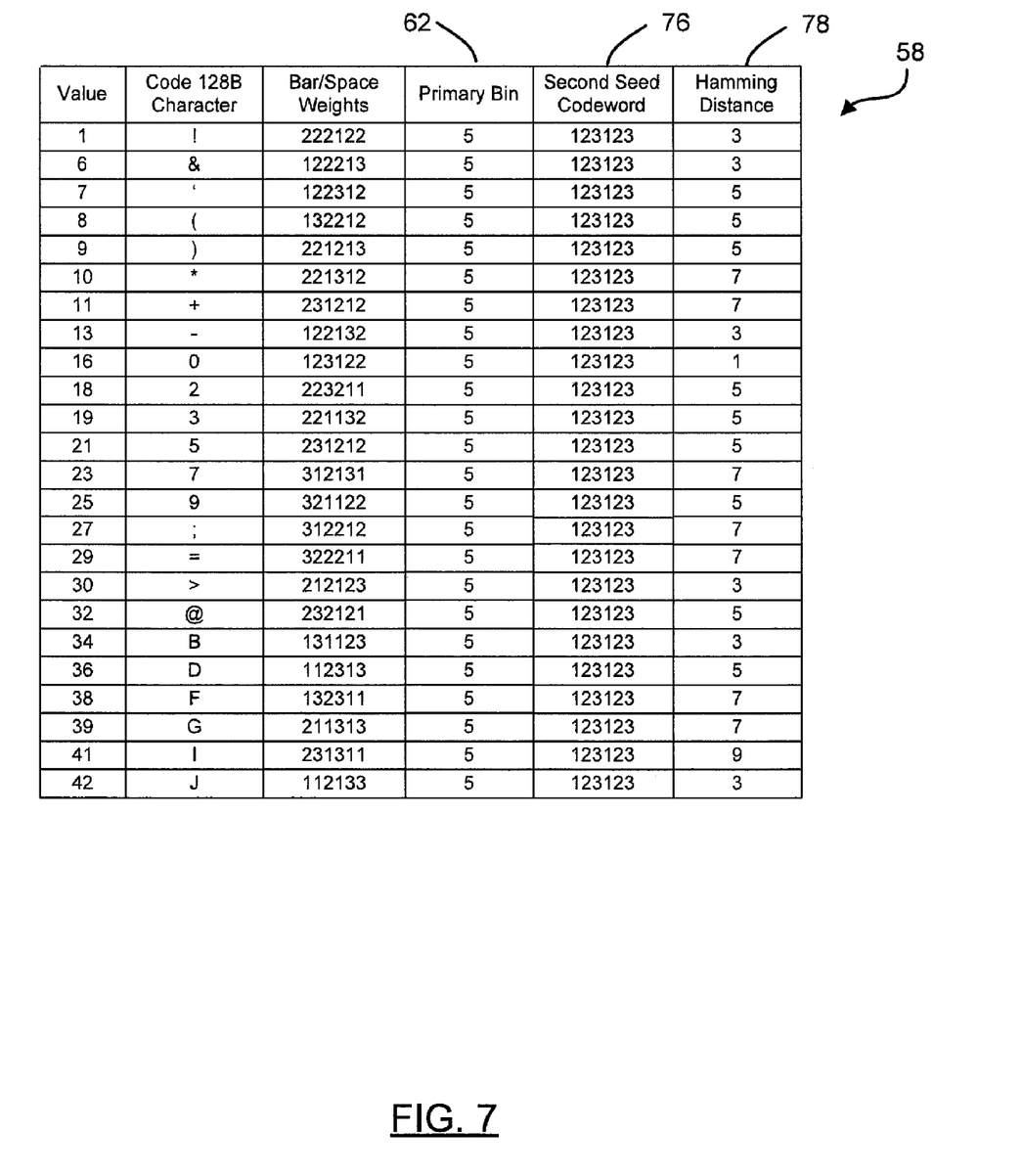
FIG. 7 is a table showing yet another embodiment of the distance map shown in FIG. 4.
Figure 8:
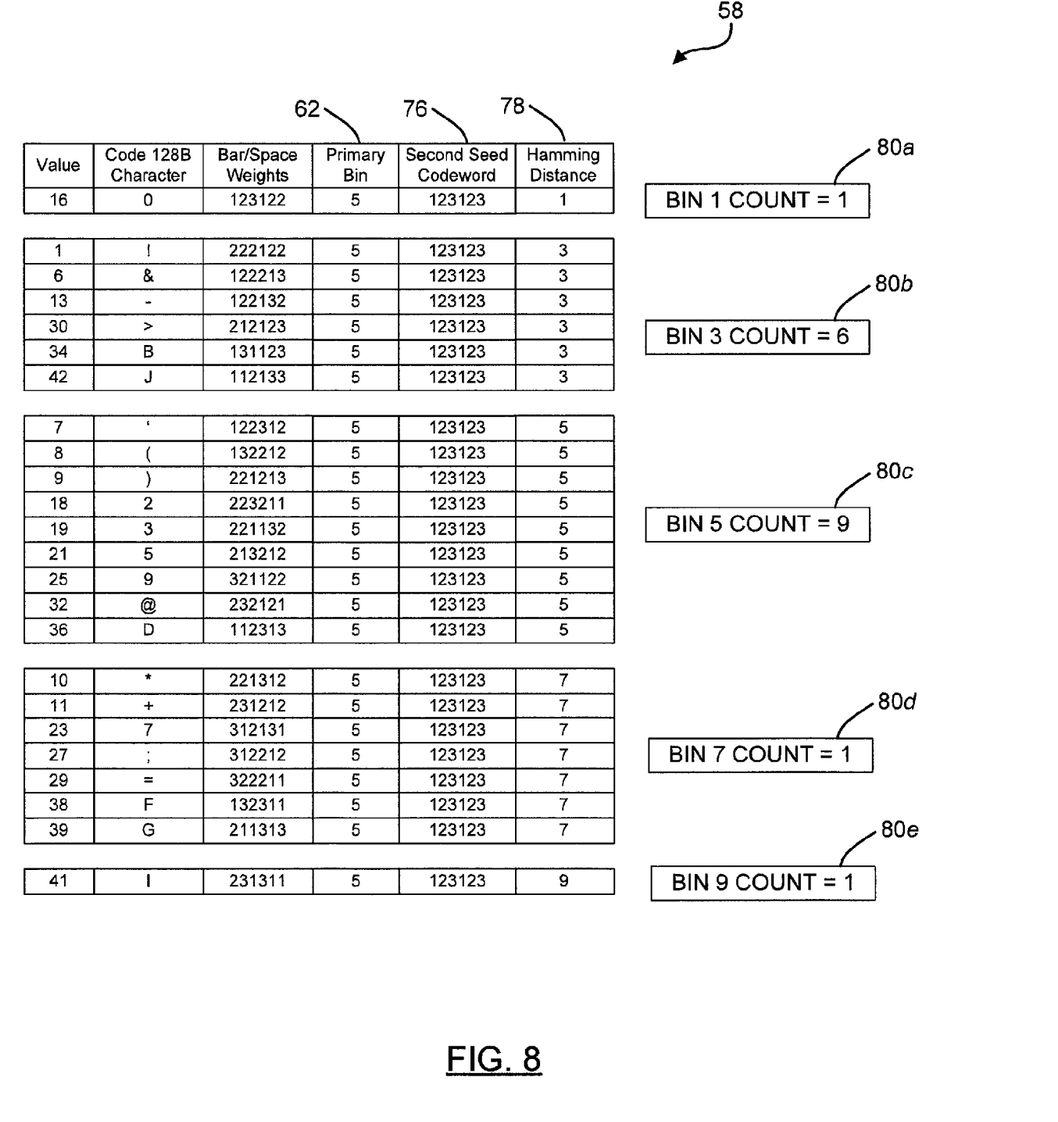
FIG. 8 is a table showing another embodiment of the distance map shown in FIG. 7.

In another embodiment of the invention, multiple seed codewords may be utilized to further refine the number of characters in each bin. In one example, secondary or sub-bins may be created to further refine the available choices within the first (or primary) bin 64. Referring back to FIGS. 4 and 5, applying the seed codeword 60 "111221" to the portion of Code 128B symbology resulted in 24 characters in bin 64*b*, the primary bin. Referring to FIG. 7, a second seed codeword 76 may be randomly selected, for example "123123," and a secondary seed distance value 78 may be computed from each character within bin 64*b* to the second seed codeword 76. In the illustrated example, the secondary seed distance values 78 are Hamming distances, but may comprise other distance calculations. Referring to FIG. 8, the distance map 58 may further include secondary or sub-bins 80 created by sorting the secondary seed distance values 78. For example, five sub-bins 80*a*, 80*b*, 80*c*, 80*d*, and 80*e* result. In furtherance of the example, suppose the exemplary optical reader 2 produced a data signal having a raw e-sequence of 0.9, 3.2, 1.1, 0.8, 2.2, 2.9. The first candidate distance value 72 calculated using Hamming distance is 5.7, corresponding to bin 64*b*. Rather than compare all 24 characters in bin 64*b*, a second candidate distance value may be computed using the second seed codeword 76 (e.g., 123123), resulting in a second candidate distance value of 3.7, corresponding to sub-bin 80*b*. The raw e-sequence may then be compared to the 6 characters in sub-bin 80*b* by any conventional or non-conventional method. In one example, quantization is utilized to arrive at an e-sequence of 1-3-1-1-2-3, corresponding to the Code 128B character "B".

One advantage of using multiple seed codewords and sub-bins may be appreciated with reference to the PDF417 symbology. The PDF417 symbology is a stacked linear barcode symbol format comprising 3 to 90 stacked rows, each row including a leading quiet zone, a start pattern, a left row indicator symbol character, 1 to 30 data symbol characters, a right row indicator symbol character, a stop pattern, and a trailing quiet zone. The data characters consist of 4 bars and 4 spaces totaling 17 elements in width. The symbology comprises three clusters of 929 characters each; adjacent stacked rows alternate clusters. Conventional decoders must compare each candidate character to 929 possible valid characters, which can be time-consuming. One implementation of the disclosed invention could be to create three sub-bins, one for each cluster. In another example, multiple layers of sub-bins could be created for each cluster (e.g., sub-sub-bins and the like).

Another example using multiple seed codewords involves computing high dimensional distances. In some applications, the decode may be more expedient if two seed codewords are selected and the distance calculated from the valid character (and the candidate character) to the two seed codewords. In one example, a distance may be calculated by the following formula:

$$DIST = \sqrt{D_1^2 + D_2^2} \quad (1)$$

where $D_1$ is a first seed distance value from a first seed codeword to a symbol character in the symbology, and $D_2$ is a second seed distance value from a second seed codeword to the symbol character. A distance table may be constructed using the DIST values, and bins may be allocated accordingly from the DIST values. A candidate distance value may then be computed from the characters read by the optical reader and compared to the value in the respective bins.

Figure 9:
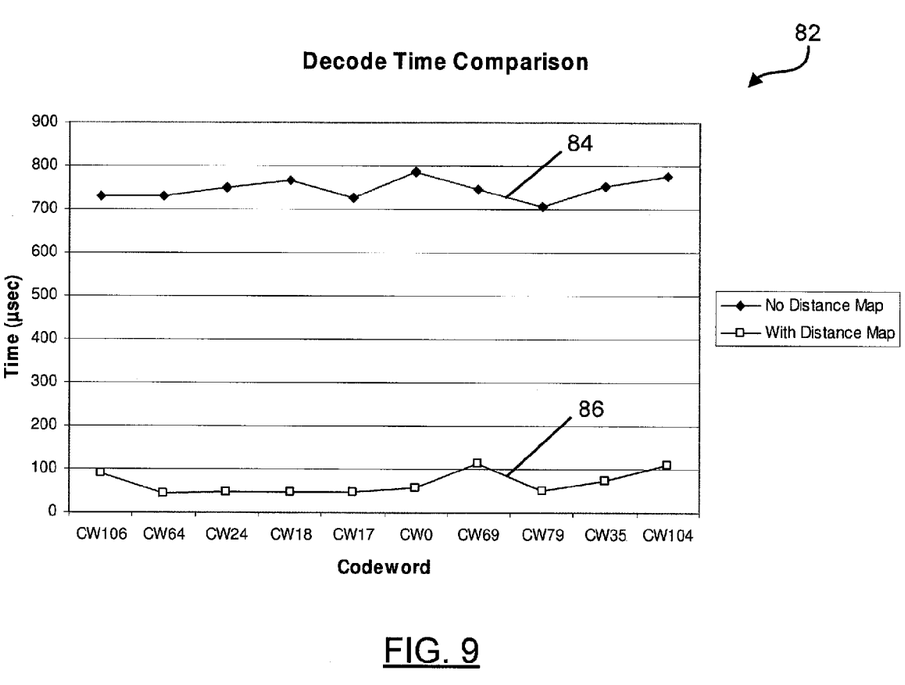
FIG. 9 is a graph showing decode results according to one embodiment of the invention.

The disclosed system and method is more efficient than comparing all the possible characters in a symbology. This efficiency may be realized several ways. In one aspect, the invention reduces the amount of time the decoder or processing module requires to decode a bar code image. Turning to FIG. 9, shows a graph 82 with actual decode results according to one embodiment of the invention. An optical reader having an ARM9 32-bit RISC processor clocked at 400 MHz attempted to decode a 10-character symbol of the Code 128 symbology. Plotted on graph 82 are a first set of results 84 using conventional decode methods in which each candidate character was compared to each character of the symbology. Also plotted on graph 82 are a second set of results 86 in which distance mapping was utilized in accordance with one embodiment of the disclosed invention. The results 84 and 86 are the average time elapsed to decode a single character; in the actual decode process, the same decode was achieved three times before returning a correct result. Thus, in the illustrated example, the total time elapsed to decode the 10-character symbol without distance mapping was approximately 24.6 milliseconds (msec), and the total time elapsed to decode the 10-character symbol with distance mapping was 2.3 msec.

In another aspect, the reduced processing time could have an improvement in decoding speed of 2×-8×. The decoding speed gain could be used to reduce power consumption, for example.

Since processor speed and number of characters in a symbology may vary among readers and applications, the two variables may be normalized to define a decoding parameter that helps quantify the improvement in efficiency. The decoding parameter may be expressed in units of processor clock cycles per character comparison. In the disclosed example, the 400 MHz processor using a conventional decoder (without distance mapping) decoded a Code 128 symbol character in approximately 746 microseconds (on average), or 1,340 characters per second. Assuming the processor on average compares 53 characters of the symbology before finding a match (e.g., 106/2), the processor compares 71,020 characters/sec. Based on the processor clock speed of 400 MHz, this number equates to a decoding parameter of approximately 5,632 processor clock cycles per character comparison (400 E6/71.0 E3). In contrast, using the distance mapping decoding method and apparatus disclosed herein, the 400 MHz processor decoded the same symbol characters in approximately 69 msec (on average), or 14,493 characters per second, or 768,129 equivalent character comparisons per second. An equivalent decoding parameter is thus 521 processor clock cycles per character comparison (400 E6/768 E3), which represents a 90% improvement in the decoding parameter. Thus, in one example distance mapping improves the decoding parameter better than a factor of ten, or an order of magnitude. Note that merely increasing processor clock speed does not impact the decoding parameter, since the ratio of processor clock speed to characters compared per unit of time remains about the same (e.g., doubling processor speed would also double number of characters compared per unit of time). Although the improvements may vary according to the particular distance map and seed codeword used, the inventor estimates the decoding parameter may be improved by at least 50%, or less than approximately 2,800 processor clock cycles per character comparison. In some embodiments, the decoding parameter may be improved by at least 75%, or less than approximately 1,400 processor clock cycles per character comparison.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:

1. An optical reader for decoding an encoded candidate character of a symbology, the optical reader comprising:

a lens system for focusing an illuminated encoded candidate character at a plane of focus;

an optical sensor having as an input detected light intensity corresponding to illumination reflected from the encoded candidate character, and having as an output an electrical signal encoding information representative of the encoded candidate character;

wherein the optical reader accesses a distance map comprising a seed codeword and a plurality of seed distance values, each seed distance value comprising a computed distance from the seed codeword to a character of the symbology;

wherein the optical reader computes a candidate distance value from the seed codeword to the encoded candidate character;

wherein the optical reader compares the encoded candidate character to a subset of the characters of the symbology, the subset comprising characters of the symbology having seed distance values within a specified range of the candidate distance value.

2. The optical reader of claim 1, wherein each subset of the characters of the symbology is a bin.

3. The optical reader of claim 2, wherein each bin comprises a range of seed distance values.

4. The optical reader of claim 1, wherein the character of the symbology and the seed codeword comprise a same number of elements.

5. The optical reader of claim 4, wherein the seed codeword is selected arbitrarily.

6. The optical reader of claim 1, wherein the same seed codeword is utilized to compute the seed distance value for each character of the symbology.

7. The optical reader of claim 1, wherein the candidate distance value is derived from a sequence of element widths.

8. The optical reader of claim 1, wherein the optical reader compares an e-sequence of the candidate character with an e-sequence of a valid character of the symbology.

9. The optical reader of claim 8, wherein the optical reader determines the e-sequence of the candidate character from a step function derived by subjecting the electrical signal to an action of the optical reader.

10. The optical reader of claim 1, wherein the distance from the candidate character to the seed codeword is a diagonal distance.

11. The optical reader of claim 1, wherein the computed distance comprises a diagonal distance.

12. The optical reader of claim 1, wherein the optical reader is a hand-held imager.

13. The optical reader of claim 1, further comprising a trigger mechanism in electrical communication with the optical sensor.

14. The optical reader of claim 1, wherein the distance map comprises a first seed codeword and a second seed codeword.

15. The optical reader of claim 14, wherein the first seed codeword is used to compute the subset of the characters of the symbology, and the second seed codeword is used to compute a second subset comprising characters of the symbology within the first subset.

16. The optical reader of claim 14, wherein the first seed codeword and the second seed codeword are used to compute a high dimensional distance.

17. A method for decoding an encoded candidate character of a symbology, the method comprising the steps of:
provided a plurality of valid barcode characters of a symbology, each barcode character having n elements in conformance with the symbology;
generating a seed codeword comprising n elements;
computing a seed distance value from the seed codeword to each character in the symbology;
generating a distance map comprising each character in the symbology and the associated computed seed distance value;
arranging the plurality of seed distance values into a plurality of bins, each bin containing a subset of the characters in the symbology;
selecting a candidate barcode character for decoding, the character comprising n elements;
computing a candidate distance value from the candidate barcode character to the seed codeword;
identifying the bin containing the candidate distance value; and
attempting to decode the candidate barcode character by comparing the candidate barcode character with the valid barcode characters in the bin having the candidate distance value.

18. The method of claim 17, further comprising the step of storing the valid barcode characters of the symbology, the seed codeword, and the seed distance values in a machine-readable storage medium.

19. The method of claim 17, wherein each bin is characterized by a range of seed distance values.

20. The method of claim 17, wherein the steps of computing a seed distance value and computing a candidate distance value comprise diagonal distance computation.

21. The method of claim 17, further comprising the step of providing a trigger mechanism, the action of which initiates the steps of selecting the candidate barcode character for decoding, computing the candidate distance value, identifying the bin containing the candidate distance value, and attempting to decode the candidate barcode character against the valid barcode characters in the bin having the candidate distance value.

22. The method of claim 17, wherein the steps of selecting the candidate barcode character for decoding, computing the candidate distance value, identifying the bin containing the candidate distance value, and attempting to decode the candidate barcode character against the valid barcode characters in the bin having the candidate distance value are performed by a processor having a clock speed, the steps being further characterized by a decoding parameter, the decoding parameter being less than 2,800 processor clock cycles per character comparison.

23. The method of claim 22, wherein the decoding parameter is less than 1,400 processor clock cycles per character comparison.

24. The method of claim 22, wherein the decoding parameter is less than 530 processor clock cycles per character comparison.

25. The method of claim 17, wherein the step of comparing the candidate barcode character with the valid barcode characters in the bin having the candidate distance value comprises calculating a minimum distance between the candidate barcode character and the valid barcode characters.

* * * * *